United States Patent
Chrystie et al.

(10) Patent No.: US 10,088,370 B2
(45) Date of Patent: Oct. 2, 2018

(54) HIGH REPETITION RATE THERMOMETRY SYSTEM AND METHOD

(71) Applicant: KING ABDULLAH UNIVERSITY OF SCIENCE AND TECHNOLOGY, Thuwal (SA)

(72) Inventors: Robin Chrystie, Thuwal (SA); Aamir Farooq, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 414 days.

(21) Appl. No.: 14/537,762

(22) Filed: Nov. 10, 2014

(65) Prior Publication Data

US 2015/0131700 A1    May 14, 2015

Related U.S. Application Data

(60) Provisional application No. 61/902,567, filed on Nov. 11, 2013.

(51) Int. Cl.
| | |
|---|---|
| G01K 11/00 | (2006.01) |
| G01J 3/10 | (2006.01) |
| G01J 3/42 | (2006.01) |
| G01J 5/00 | (2006.01) |

(52) U.S. Cl.
CPC ............ *G01K 11/00* (2013.01); *G01J 3/10* (2013.01); *G01J 3/42* (2013.01); *G01J 5/0014* (2013.01); *G01J 2003/423* (2013.01)

(58) Field of Classification Search
CPC .... G01J 5/0014; G01J 3/10; G01J 3/42; G01J 2003/423; G01K 11/00
See application file for complete search history.

(56) References Cited

U.S. PATENT DOCUMENTS

| | | | | |
|---|---|---|---|---|
| 3,909,132 A | * | 9/1975 | Barrett | G01J 5/601 356/301 |
| 4,369,525 A | * | 1/1983 | Breton | H04B 10/564 372/30 |
| 4,493,553 A | * | 1/1985 | Korb | G01D 5/26 356/43 |
| 4,707,147 A | * | 11/1987 | Aoki | G01J 5/0014 356/43 |
| 4,930,134 A | * | 5/1990 | Macaione | G01K 7/01 372/31 |

(Continued)

OTHER PUBLICATIONS

"Chirped Pulses" from Seti@Home (https://setiathome.berkeley.edu/ap_chirp.php), University of California, © 2017.*

(Continued)

*Primary Examiner* — Randy Gibson
(74) *Attorney, Agent, or Firm* — Patent Portfolio Builders PLLC

(57) ABSTRACT

A system and method for rapid thermometry using intrapulse spectroscopy can include a laser for propagating pulses of electromagnetic radiation to a region. Each of the pulses can be chirped. The pulses from the region can be detected. An intrapulse absorbance spectrum can be determined from the pulses. An instantaneous temperature of the region based on the intrapulse absorbance spectrum can be determined.

20 Claims, 8 Drawing Sheets

(56) References Cited

U.S. PATENT DOCUMENTS

| | | | | |
|---|---|---|---|---|
| 5,073,838 | A * | 12/1991 | Ames | H01S 5/06209 327/512 |
| 5,235,606 | A * | 8/1993 | Mourou | H01S 3/2316 372/20 |
| 5,499,134 | A * | 3/1996 | Galvanauskas | G02B 6/2713 359/333 |
| 5,862,287 | A * | 1/1999 | Stock | G02B 6/29394 359/332 |
| 8,135,050 | B1 * | 3/2012 | Stadler | H01S 3/0057 372/31 |
| 8,790,006 | B2 * | 7/2014 | Li | G01J 3/02 374/120 |
| 8,946,633 | B2 * | 2/2015 | Tomioka | G01J 3/42 250/332 |
| 9,014,223 | B2 * | 4/2015 | Miesak | H01S 3/0057 372/102 |
| 9,506,807 | B2 * | 11/2016 | Ido | G01J 5/0896 |
| 9,551,619 | B1 * | 1/2017 | Brown | G01J 5/00 |
| 2003/0218750 | A1 | 11/2003 | Friberg et al. | |
| 2004/0036007 | A1 * | 2/2004 | Wilson | G01J 1/44 250/205 |
| 2005/0286578 | A1 * | 12/2005 | Uchida | H04B 10/503 372/34 |
| 2014/0036964 | A1 * | 2/2014 | Asahina | H04J 13/0077 375/141 |
| 2018/0045563 | A1 * | 2/2018 | Marta | G01J 3/0229 |

OTHER PUBLICATIONS

"Chirped-pulse Amplification" by Dr. Rüdiger Paschotta, Encyclopedia of Laser Physics and Technology (https://www.rp-photonics.com/chirped_pulse_amplification.html) accessed on Mar. 29, 2017.*

"Chrip, Chirped Pulses" by Dr. Rüdiger Paschotta, Encyclopedia of Laser Physics and Technology (https://www.rp-photonics.com/chirp.html) accessed Mar. 29, 2017.*

PCT/IB2014/003028 Search Report and Written Opinion dated Apr. 30, 2015.

Nwaboh, J.A., et al., "Measurement of CO amount fractions using a pulsed quantum-cascade laser operated in the intrapulse mode," Applied Physics B Laser and Optics (2011) vol. 103 pp. 947-957.

Einecke, S., et al., "Measurement of temperature, fuel concentration and equivalence ration fields using tracer LIF in IC engine combustion," Applied Physics B Laser and Optics (2000) vol. 71 pp. 717-723.

Chrystie, Robin, et al., "Ultra-Fast Calibration-Free Sensor for Temperature and Species Measurements in Combustion," Laser Diagnostic in Combustion, GRC (2013).

"Homogeneous Charge Compression Ignition (HCCI) Technology," A Report to the U.S. Congress, U.S. Department of Energy, Energy Efficiency and Renewable Energy, Office of Transportation Technologies, Apr. 2001.

Ebert, V. et al., "Simultaneous Diode-Laser-Based in Situ Detection of Multiple Species and Temperature in a Gas-Fired Power Plant," Proceedings of the Combustion Institute, Dec. 2000, vol. 28, pp. 423-430.

Farooq, A., et al., "Measurements of CO2 Concentration and Temperature at High Pressures Using 1f-Normalized Wavelength Modulation Spectroscopy with Second Harmonic Detection Near 2.8 μm," Applied Optics, Dec. 10, 2009, vol. 48, No. 35, pp. 6740-6753.

Grouiez, B., et al., "Pulsed Quantum-Cascade-Laser Spectroscopy with Intermediate-Size Pulses: Application to NH3 in the 10 μm Region," Applied Physics B, Lasers and Optics, Mar. 27, 2010, vol. 100, pp. 265-273.

Kranendonk, L.A., et al., "Wavelength-Agile Sensor Applied for HCCI Engine Measurements," Proceedings of the Combustion Institute, Jan. 2005, vol. 30, pp. 1619-1627.

Li, H. et al., "Near-Infrared Diode Laser Absorption Sensor for Rapid Measurements of Temperature and Water Vapor in a Shock Tube," Applied Physics B, Lasers and Optics, Sep. 26, 2007, vol. 89, pp. 407-416.

Manne, J., et al., "Sensitive Detection of Ammonia and Ethylene with a Pulsed Quantum Cascade Laser Using Intra and Interpulse Spectroscopic Techniques," Applied Physics B, Laser and Optics, Nov. 15, 2008, vol. 94, pp. 337-344.

Normand, E., et al., "Fast, Real-Time Spectrometer Based on a Pulsed Quantum-Cascade Laser," Optics Letters, Jan. 1, 2003, vol. 8, No. 1, pp. 16-18.

Northern, J.H., et al., "Rapid Passage Signals Induced by Chirped Quantum Cascade Laser Radiation: K State Dependent-Delay Effects in the v2 Band of NH3," Optics Letters, Aug. 15, 2010, vol. 35, No. 16, pp. 2750-2752.

Rieker, G.B., et al., "Rapid Measurements of Temperature and H20 Concentration in IC Engines with a Spark Plug-Mounted Diode Laser Sensor," Proceedings of the Combustion Institute, Dec. 17, 2007, vol. 31, pp. 3041-3049.

Rothman, L.S., et al., "The HITRAN 2008 Molecular Spectroscopic Database," Journal of Quantitative Spectroscopy & Radiative Transfer, Jun.-Jul. 2009, vol. 110, pp. 533-572.

Sanders, S.T., et al., "Diode-Laser Sensor for Monitoring Multiple Combustion Parameters in Pulse Detonation Engines," Proceedings of the Combustion Institute, Dec. 2000, vol. 28, pp. 587-594.

Van Helden, J.H., et al., "Rapid Passage Effects in Nitrous Oxide Induced by a Chirped External Cavity Quantum Cascade Laser," Applied Physics Letters, Feb. 6, 2009, vol. 94, pp. 051116-1-0511161-3.

* cited by examiner (a)

$$S_{curve} = \frac{T}{\overline{v}_2 - \overline{v}_1} \int_{\overline{v}_1}^{\overline{v}_2} \left| \frac{\partial \ln \alpha_v}{\partial T} \right| d\overline{v}$$

(b)

$$S_{area} = \frac{dR/R}{dT/T} = \frac{1460}{T}$$

HIGH REPETITION RATE THERMOMETRY SYSTEM AND METHOD

CLAIM OF PRIORITY

This application claims priority from U.S. Provisional Patent Application No. 61/902,567, filed Nov. 11, 2013, which is incorporated by reference in its entirety.

TECHNICAL FIELD

The present invention is directed to a sensor system and method including a pulsed laser and intrapulse spectroscopy for thermometry.

BACKGROUND

In situ temperature measurements in combustion environments such as engine, research, and power-generation applications, as well as for other gaseous or plasma applications such as semiconductor processing, can be useful for achieving a wide array of benefits.

Combustion has been exploited by mankind for millennia. The combustion process has been increasingly integrated into more sophisticated devices over time. This can impose greater demands on the insight and need for control of such devices, for example, in order to harness stability of operation, increased efficiency and pollution control within tight bounds. The internal combustion engine (ICE) is a prime example, whose application is so widespread that improvement of the internal combustion process can improve fuel consumption and directly abate pollution on a global scale.

SUMMARY

In an aspect, a sensor system can include a laser and at least one detector. The laser can be configured to produce chirped pulses. As usually understood in the art, the "chirp" of an optical pulse is the time dependence of its instantaneous frequency. Specifically, as the term is used in this document, an up-chirp (down-chirp) means that the instantaneous frequency rises (decreases) with time; see *HP Photonics Dictionary*, for example. The detector can be configured to receive a measurement beam from the laser. The sensor system can be configured to record an intrapulse absorption spectrum.

In some embodiments, the laser can be a quantum cascade laser. One or more of the at least one detector can be a photodiode. The laser can be a distributed feedback quantum cascade laser. The laser can be an external cavity laser. The laser can be an extended cavity laser.

In other embodiments, the system can include a second detector. The second detector can be configured to receive a reference beam from the laser.

In yet other embodiments, each of the chirped pulses can be less than 10 microseconds in duration and/or less than 1 microsecond in duration. The sensor system can be configured to determine a temperature based on the intrapulse absorption spectrum. In some embodiments, each of the chirped pulses can be less than 500 nanoseconds in duration and/or less than 100 nanoseconds in duration.

In other embodiments, the laser can be an extended cavity laser comprising a temperature controller and a voltage controller. The laser can be a distributed feedback quantum cascade laser. The photodiode can be a high bandwidth photodiode. The sensor system can be further configured to determine a temperature based on the intrapulse absorption spectrum.

In another aspect, a method of measuring a temperature of a material can include tuning a beam of coherent electromagnetic radiation to a range of peak absorbance in the material. The beam can be transmitted through the material and chirped at a rate of less than 5 microseconds. An intrapulse absorbance of the beam can be measured. The temperature can be determined based on the intrapulse absorbance.

In yet another aspect, a method of rapid thermometry using intrapulse spectroscopy can include propagating pulses of electromagnetic radiation to a region. Each of the pulses can be chirped. The pulses can be detected emanating from the region. From the pulses an intrapulse absorbance spectrum can be determined. An instantaneous temperature of the region can be determined based on the intrapulse absorbance spectrum.

In some embodiments, detecting the pulses from the region can include detecting reference pulses and detecting measurement pulses.

In other embodiments, the instantaneous temperature can be determined based on an integration of two spectral lines. Each of the pulses can have a pulse duration of less than 1 microsecond and/or a pulse duration of less than 500 nanoseconds. The intrapulse absorbance spectrum can be based on an aggregation of spectra.

In an aspect, a rapid thermometry system can be configured to record an intrapulse absorption spectrum. The system can include a laser, a detector, and a computer. The laser can be configured to produce chirped pulses. The detector can be configured to receive a measurement beam from the laser. The computer can include a non-transitory computer readable medium which contains executable code. The computer and the executable code can be configured to detect the chirped pulses, determine from the chirped pulses the intrapulse absorption spectrum, and determine an instantaneous temperature of the region based on the intrapulse absorption spectrum.

In some embodiments, the intrapulse absorption spectrum can contain two spectral lines. The computer and the executable code can further be configured to integrate the two spectral lines to determine the instantaneous temperature.

BRIEF DESCRIPTION OF THE DRAWINGS

The following drawings form part of the present specification and are included to further demonstrate certain aspects of systems and methods described herein, which may be better understood by reference to one or more of these drawings in combination with the detailed description of specific embodiments presented herein.

DETAILED DESCRIPTION

Figure 1:
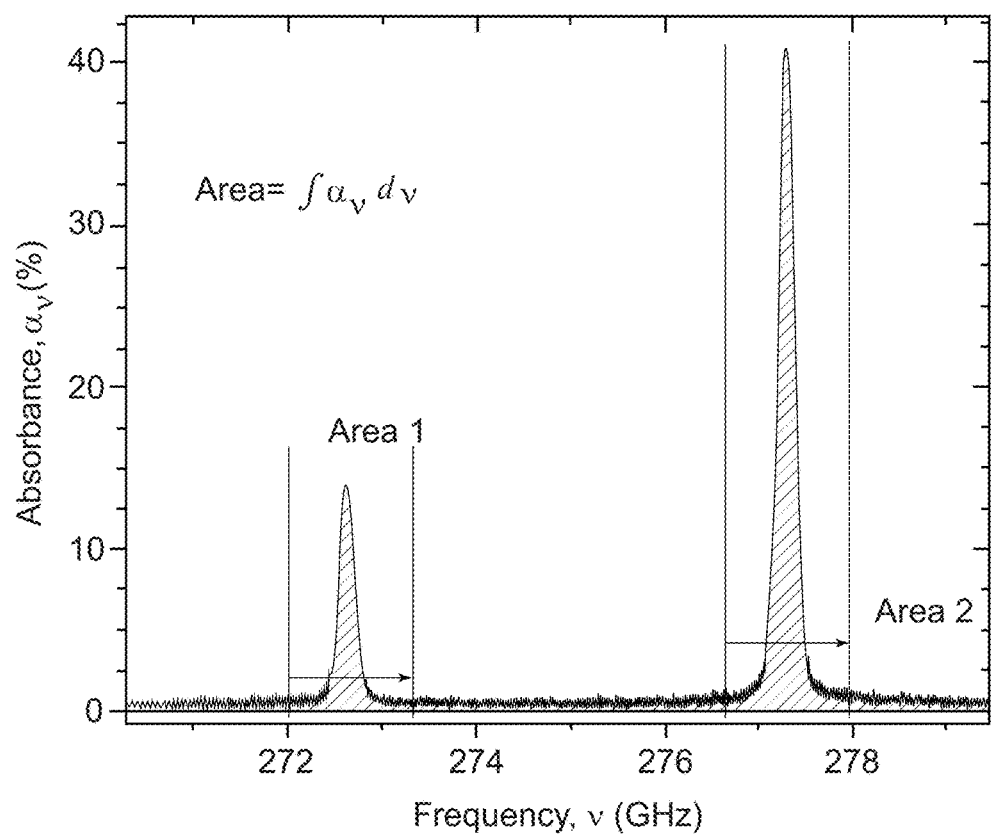
FIG. 1 depicts an exemplary scan of two spectral lines denoting the integrated areas that can be used to infer a calibration-free temperature measurement.

Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention.

The increased integration of volatile systems such as combustion engines in modern devices imposes greater demands on the insight and need for control of such devices, in order to harness stability of operation, increased efficiency and pollution control within tight bounds. Control of combustion, and understanding of its mechanisms, can be key to fulfilling such objectives. With the advancement of laser based technology over the past few decades, more detailed, yet important, insight has been garnered about how the combustion process behaves in the context of its technological application (e.g. in ICEs, jet engines, power plants, new-age micro-combustors). In this vein, two significant parameters of interest comprise molecular species composition and temperature of combusting gases.

Rapid temperature measurement, also known as rapid thermometry, is often a nontrivial task. Accurate thermometry can require a method that is non-invasive to the system that is being measured. Measuring rapid temperature fluctuations of combustion gases can be less straightforward than simply inserting a thermocouple into a gas. Such traditional devices are invasive and have limited temporal and spatial resolution.

Advanced thermometric embodiments described herein can be powerful tools for making time-resolved precise measurements of temperature (as well as $H_2O$ composition) in environments in which thermodynamic parameters rapidly evolve over the course of microseconds. Applications in addition to those set forth herein elsewhere can include pulsed-detonation engines, scramjets, and gas turbines in which the gases internal to these devices undergo rapid transients.

A ubiquitous system for application is the internal combustion engine (ICE) where the temperature (T), pressure (P) and composition (X) of the gases inside the cylinder rapidly change during the course of a single cycle. Diode-laser absorption spectroscopy techniques can be adapted and applied for in situ measurements of pertinent combustion parameters, for example, in ICEs and/or in pulse detonation engines (PDEs). Other areas that such techniques can be employed include research and power-generation applications.

An intrapulse spectroscopic technique can be useful for measuring fundamental transient radiation-molecular interactions termed the "rapid passage effect." Mid-IR pulsed distributed feedback (DFB) quantum cascade lasers (QCLs), which can achieve repetition rates on the order of Megahertz, can be utilized for such techniques. Such techniques, however, have not previously been well-defined. For example, direct absorption in a multipass cell with an effective path length of 9.6 m to detect 500 ppb of 1,1-difluoroethylene has been demonstrated under static conditions, in which no transients were present, but an investigation of the time resolution capabilities of such a technique for inferring species composition has not been previously achieved.

Another approach using a technique of wavelength modulation spectroscopy (WMS) can be used in thermometry. Such techniques can involve rapid and short range spectral scanning in and around an absorption peak of interest. A plurality of diode lasers, as well as a lock-in amplifier, can be used to probe spectral lines. Shock tube studies have shown that such techniques can capture changes in temperature between 1200 and 1700 K at pressures between 1.3 and 1.6 atm with an $H_2O$ composition of 1%. By increasing the complexity of the WMS technique applied to a spark ICE, more accurate thermometry has been shown at a rate of 7.5 kHz, 500<T<1000 K, 1<P<50 atm, where the water composition is $1<X_{H_2O}<2.3\%$.

Direct absorption spectroscopy of water to in a homogeneous charged compression ignition (HCCI) engine can be possible at a modest repetition rate of 12 kHz. The technique can also be applied to measure temperatures for example in a firebox of a power plant. However, such techniques have not been calibration free. Further, such techniques have suffered from discontinuities in what should otherwise be smooth normal operation of an extended cavity diode laser.

Prior thermometry techniques do not have a sufficient repetition rate to give for example a sufficient temporal resolution for engines or shock tubes. Moreover, prior techniques are also not simultaneously calibration free (i.e. not having to rely on knowledge of pressure and composition to deduce temperature).

Embodiments herein can very rapidly scan (downchirp) over hundreds of nanoseconds across the $H_2O$ transition lines. This can be an improvement over the fixed-wavelength method, preserving the calibration free character whilst concurrently preserving excellent temporal resolution of the order of sub-µs. Furthermore, it should be noted that the signal strength, S, used to infer temperature from present embodiments can be very good (with signal to noise ratios of the order of 100-200). This can be attributable to appreciable peak powers of 50 mW and probing the ro-vibrational bands of $H_2O$ in the mid-IR, where there are an abundance of relatively strong fundamental transitions. The DFB pulsed QCL can also provide stability, showing very little jitter. Furthermore, the laser itself can be compact. For example, embodiment can be implemented with a single laser. Embodiments provide ease of use, and data that can be derived from the techniques can be easy to interpret.

Embodiments described herein, as well possessing high temporal and spatial resolution, overcome limitations of thermocouples and invasive systems by, for example, utilizing laser based sensors. These devices do not involve inserting a physical probe into the system of interest. Laser based sensors have been used to monitor temperature in combustion gases. However, previous attempts are prone to inaccuracy due to inherent changes in molecular composition. Such changes can distort the spectral profiles, and hence change the absorption peak intensity. While, single absorption peak intensity can be utilized, a more thorough approach is to scan across two entire absorption spectral lines to infer temperature. This can eliminate the need for prior knowledge of composition, thus rendering the present approach calibration-free.

Pressure changes can also affect spectral line shape, and can also be mitigated by scanning. A potential challenge is that the laser based sensor should be sufficiently sensitive to changes in temperature—it should be able to monitor changes that are often seen in the system under observation. For example, if a temperature sensor is applied to an internal combustion engine with an operating pressure range of 1 to 50 atm, the sensor can be configured to capture temperatures over a corresponding range. This can be done by choosing spectral lines that are not too close to each other, which enhances the temperature sensitivity of the sensor.

Embodiments can utilize principles of laser absorption, where a laser beam is directed through a gaseous mixture of path length, L. Laser-based sensors can be used to determine the mole fraction of species of interest in a gas mixture using direct absorption spectroscopy (DAS), which is governed by the Beer-Lambert Law, $$\frac{I}{I_0} = e^{-\alpha_\nu} \qquad \text{Eqn. (1)}$$

which relates the intensity transmitted through a gas medium, I, to the incident intensity, $I_0$, by the absorbance, $\alpha_\nu$. Absorbance is a function of the laser path length, L, the total pressure of the gas, P, the mole fraction of the absorbing species, X, and spectroscopic parameters that make up the linestrength, S, and lineshape function, $\phi_\nu$:

$$\alpha_\nu = SPXL\phi_\nu \qquad \text{Eqn. (2)}$$

The incident and transmitted intensities can be measured which can enable the determination of the mole fraction if the other parameters are known. Spectroscopic parameters which define the linestrength and lineshape function can be determined so that the mole fraction can be measured when the pressure and path length are known.

Using a scanning approach, temperature can be computed using the two-line equation $$T = \frac{\frac{hc}{k}(E_2'' - E_1'')}{\ln R + \ln \frac{S_2(T_0)}{S_1(T_0)} + \frac{hc}{k}\frac{(E_2'' - E_1'')}{T_0}} \qquad \text{Eqn. (3)}$$

Where h, c, k and E" are constants. $S(T_0)$ is the linestrength at a reference temperature of $T_0$ (usually 296K). Importantly, R is the ratio of linestrengths, $S_1(T)/S_2(T)$, at temperature, T, which is also equivalent to the ratio of integrated areas, $A_1/A_2$, under the two corresponding spectral lines, as demonstrated graphically in FIG. 1. Specifically, FIG. 1 shows an exemplary scan of two spectral lines denoting two integrated areas used to infer a calibration-free temperature measurement.

Embodiments can include direct absorption scan (DAS) integrated with intrapulse spectroscopy. Conventional approaches of using a laser that scans relatively slowly across a wavelength interval to completely capture selected spectral lines (as shown in FIG. 1) is insufficiently fast enough to temporally resolve temperature in rapidly evolving systems. Conventional methods can include the use of extended cavity diode lasers (ECDLs) or current-scanned distributed feedback (DFB) lasers that typically scan below 10 kHz, often with a narrow effective scanning range of 3 GHz, corresponding to a 0.1 $cm^{-1}$ bandwidth. Present embodiments can address such shortcomings by utilizing, for example, a fixed wavelength strategy. Present embodiments can be implemented wherein the wavelength output of the laser is not scanned (substantially fixed at a constant wavelength) but can be rapidly pulsed at rates up to at least several MHz Current embodiments also address issues with interpretation of data. For example, conventional techniques require calibration. If composition and pressure of the gases is changing, calibration can be rendered ineffective. Further, conventional techniques require at least two lasers to implement. Current embodiments circumvent such issues associated with (i) calibration, (ii) limited scanning range and (iii) insufficient repetition rate. For example, in an embodiment, DAS and intrapulse spectroscopy are integrated.

Figure 2:
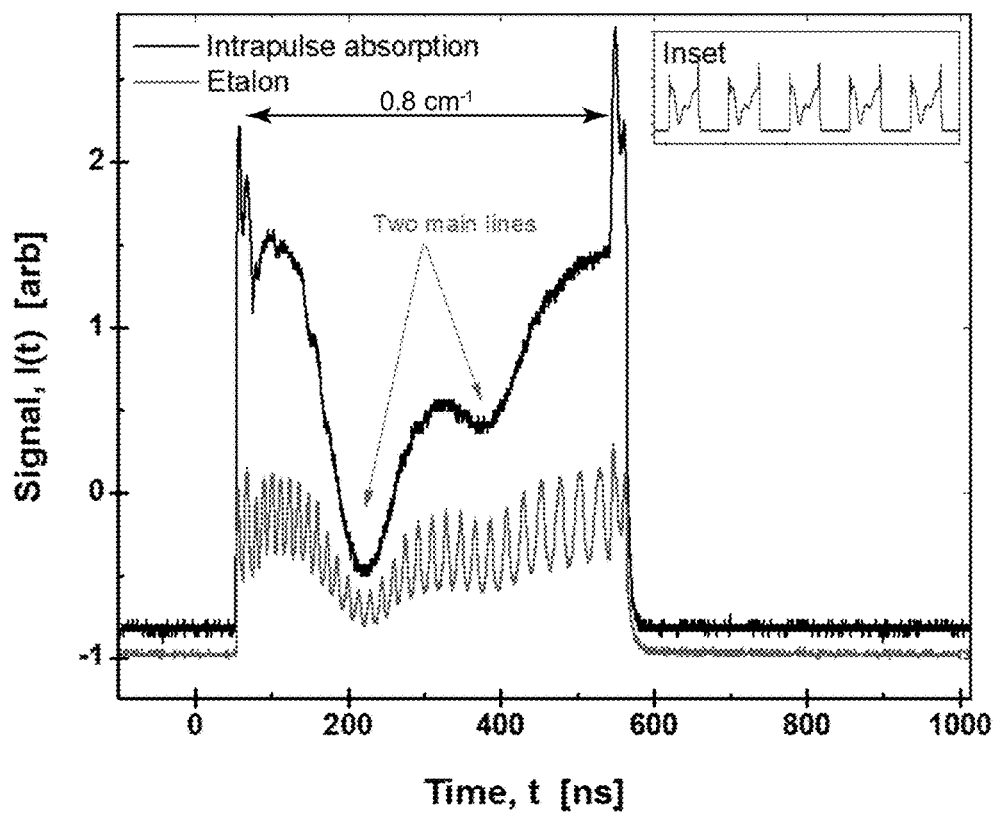
FIG. 2 depicts an example of two $H_2O$ absorption lines shown embedded within a pulse and a train of pulses at a repetition rate of 1 MHz

DAS can be performed within a downchirped pulse. Each pulse can have a duration on the order of 100 ns to 1 µs, for example 500 ns or 2 µs. FIG. 2 shows an example for a pulse duration of 500 ns. The laser was supplied with a square wave pulse train from a function generator at 1 MHz, 50% duty cycle. The resulting train of pulses at the corresponding repetition rate of 1 MHz is shown in the inset of FIG. 2. The jagged absorption line shows $H_2O$ absorption embedded within a pulse. The periodically varying line portrays an etalon scan, which shows the evident downchirp (c. 0.8 $cm^{-1}$) across the pulse, i.e. a very rapid wavelength scan in the course of 500 ns.

Another advantage of the present system is that embodiments can be remarkably straightforward with small footprints, allowing portability. For example, QCLs can be very small. Further, embodiments do not require a second laser, bulky lock-in amplifiers, or wavemeters. However, embodiments can be implemented with such devices where appropriate.

Figure 3:
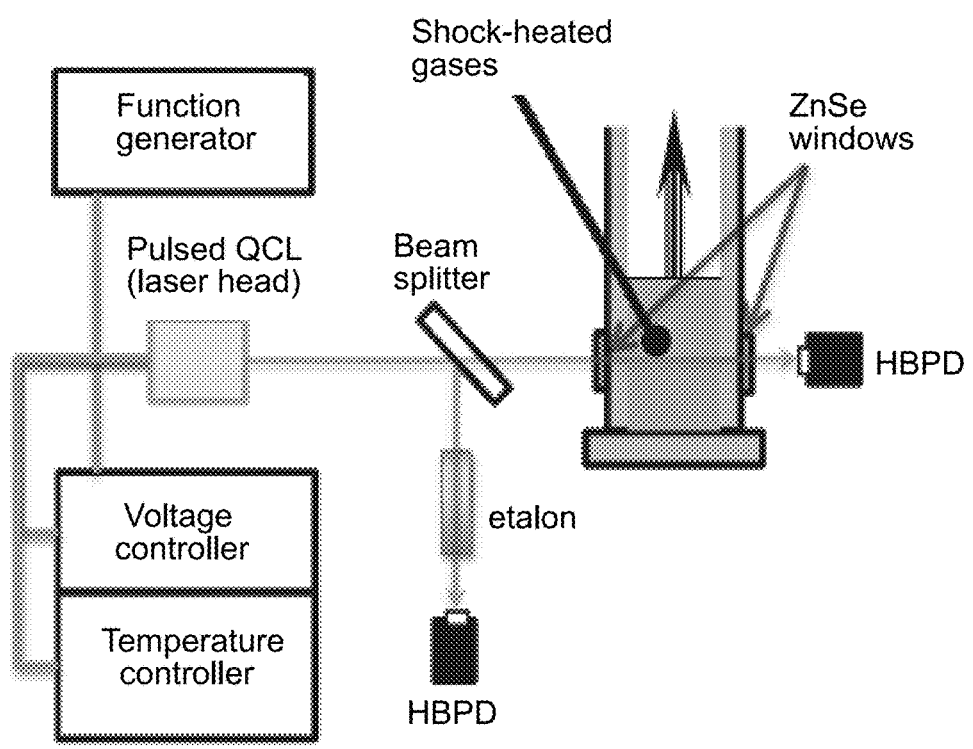
FIG. 3 depicts a schematic of an exemplary system embodiment for measuring temperature using an intrapulse method.

FIG. 3 is a schematic of an exemplary system for performing an embodied intrapulse thermometric method. The system can include a pulsed quantum cascade laser (QCL) and high bandwidth photodiodes (HBPD). A beam splitter can be configured in the beam path to split the beam into reference and measurement arms. The laser can be tuned through various known means. An exemplary means for tuning a laser head can be a voltage controller and/or a temperature controller. The pulse train can be controlled by, for example, a function generator, though various means can be utilized such as switching, mode-locking, pulsed pumping, and other pulsing techniques. The system can further include, though not shown, an oscilloscope—for example analog or digital, or other instrument that can allow observation of varying signals—and/or a computer processor for reading, storing, and processing signal data.

For non-limiting, illustrative purposes to a person of skill in the art, an exemplary implementation of the embodiment of FIG. 3 can include various off-the-shelf components. For example, a model sb4332 from Alpes Lasers (Neuchatel, Switzerland) can be utilized as it is tunable over 1312 to 1316.4 $cm^{-1}$ by adjusting the laser temperature and source voltage. The laser temperature can be varied using, for example, the TCU200 temperature controller also supplied by Alpes Lasers. The voltage can be regulated using a voltage controller, for example, a GW Instek GPS-3030D. The timing of the pulsing (i.e. pulse duration and duty cycle) can be regulated by a function generator such as an SRS DS345. The laser head can be mounted on an aluminum plate. The pulsed IR laser beam emerging from the laser head can be split using a ZnSe plate. The newly directed beam, i.e. the reference beam, can be directed through a germanium (Ge) etalon (76 mm long with a free spectral range of 494 MHz) towards a fast (high bandwidth—500 MHz) thermoelectrically cooled, optically immersed photovoltaic detector (Vigo PVI 4TE-10.6-1xl-T08-BaF2). The residual IR beam from the beam splitter, i.e. the measurement beam, can be directed through a shock tube via ZnSe windows toward another HBPD (Vigo PVI 4TE-10.6-1xl-T08-BaF2). The path traversed through the shock tube can correspond to the inner diameter of the tube (i.e. 14 cm). The pressure within the shock tube can be monitored by a series of calibrated capacitance manometers and transducers supplied by MKS and Kistler respectively.

Figure 4:
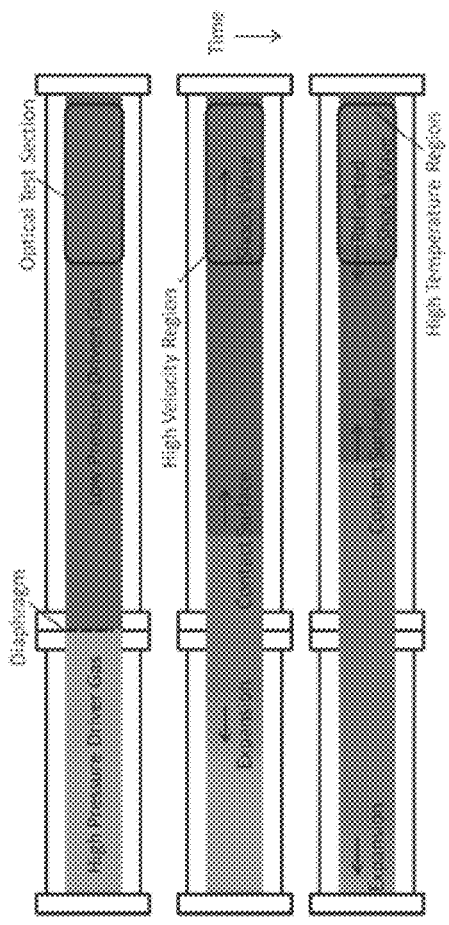
FIG. 4 depicts a schematic of how an exemplary shock tube operates.

FIG. 4 below shows how a shock tube can be used to generate high temperature gases through shock heating. The tube above can initially be partitioned into two sections—a high pressure region to the left, and a lower pressure to the right. These regions can be partitioned by a breakable diaphragm, which can be, for example, plastic or other material. The low pressure region can be filled with a gaseous mixture of specified composition to a low pressure—for example, on the order of 50 Torr. For example, mixtures of 1-2% $H_2O$ in argon can be used. With the diaphragm in place, the high pressure region can be filled with a driver gas (sometimes helium) until the diaphragm bursts. The spontaneous bursting of the diaphragm can allow the high pressure of the driver section of the tube to be transmitted rapidly down the rest of the tube. As illustrated in the second stage in FIG. 4, the expansion shows the shock wave approaching the end wall. As the shock wave propagates down the tube, the gases in its wake are rapidly heated and pressurized (i.e. "shock heated"). Finally, as portrayed in the third stage in FIG. 4, the shock wave reflects from the end wall, and shock further heats the gas in its wake. Laser based measurements can be recorded after the reflected shock wave passes the small ZnSe windows or at other times and/or stages in the operation of the shock tube.

An exemplary procedure for experimentally determining instantaneous temperature inside a shock tube can include evacuating the shock tube using vacuum pumps while the laser is switched off. The signals from HBPDs can be recorded on an oscilloscope. This recording can be used to subtract the background signal to obtain a true signal. With the driven section of the shock tube filled, for example, with an argon-water gaseous mixture of low pressure (10-50 Torr), the laser can be switched on and an appropriate voltage and laser head temperature can be selected to obtain a preferred output wavelength, for example near 7.62 μm which is close to $H_2O$ transitions of interest. The driver section can be pressurized until the diaphragm ruptures. Absorption measurements can then immediately be recorded as soon as the shock wave passes the measurement point close to the end wall, as illustrated in FIG. 3.

Figure 5:
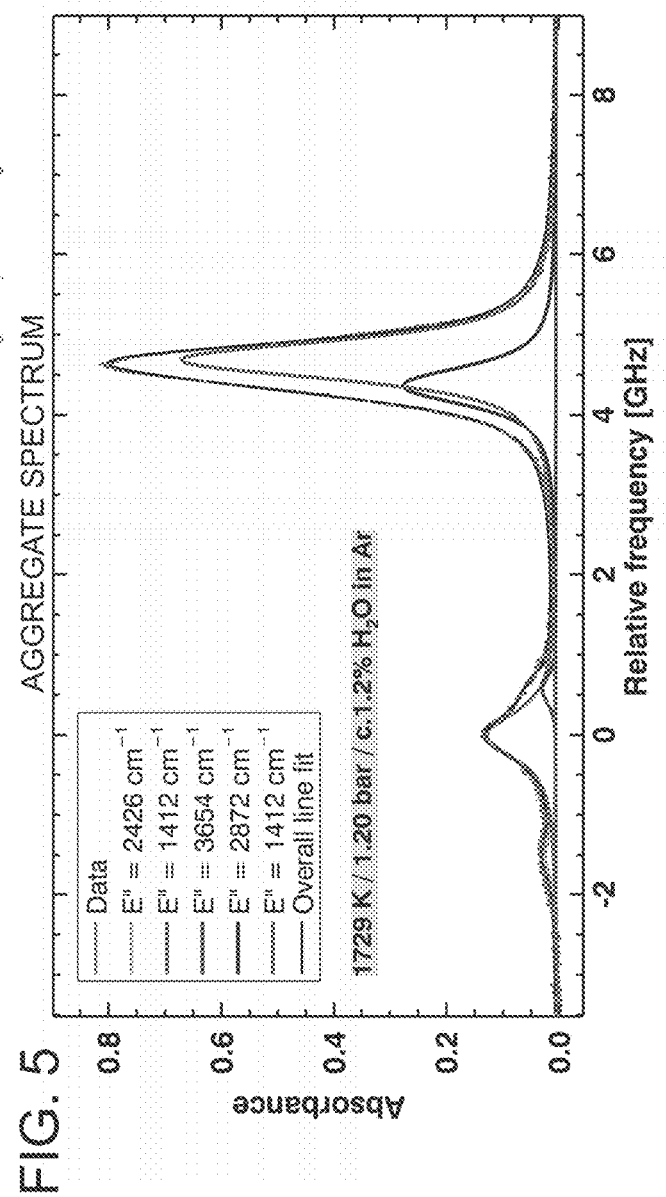
FIG. 5 depicts spectral lines in the wavenumber range of 1312 to 1313 $cm^{-1}$, an aggregate spectrum, and two underlying lines (1 and 2) that can be used to infer temperature.

The wavelength output centered near 7.62 μm can be controlled by temperature and voltage controllers. The correct wavelength tuning can be important in order to be able to probe a certain region of the IR spectrum of water. FIG. 5 shows five overlapping lines of the spectral region, which result in an aggregate spectrum at 1 atm, 1000K and at 1% water in argon. The spectral lines are in the wavenumber range of 1312 to 1313 $cm^{-1}$. Five lines of various lower level energies, E", of $H_2O$ are located near each other, which overlap to form the aggregate spectrum. Two underlying lines (shown as 1 and 2 in the figure) can be used to infer the temperature. The span of the spectrum here corresponds to a time of 300 ns of downchirp.

Temperature can be inferred from each set of data for each pulse. For example, background corrected signals corresponding to empty and full states can be taken. Herein, "empty" can refer to the shock tube under vacuum, and "full" can refer to the shock tube full of heated gases after the passing of the shock wave. An exemplary raw signal is shown in FIG. 2, which corresponds to the full state. The empty signal can be divided by the full one, and a logarithm can be taken to determine an absorbance spectrum. For example, the natural logarithm can be determined as in Eqn. (1). This absorbance spectrum, $\alpha_v$, looks very similar to the aggregate spectrum in FIG. 5. The theoretical aggregate spectrum can be fitted to the experimental absorbance spectrum, for example, through a process of varying free floating parameters that describe the underlying five spectral lines. Once the experimental spectrum has been fitted, the instantaneous temperature can be calculated, for example, by integrating two of the underlying lines. The ratio of the integrated lines can be used in the "two-line" temperature equation (Eqn. (3)).

In order to infer the temperature accurately, the reference values of the line strengths (i.e. S.) taken from the HITRAN database need to be updated, as they are commonly known to harbor errors of up to 20%. HITRAN is an acronym for "high-resolution transmission molecular absorption database," which is a publicly accessible database of spectroscopic parameters that a variety of computer codes can use to predict and simulate the transmission and emission of light in the atmosphere. A continuous wave (cw) extended cavity quantum cascade laser (ECQCL) can be utilized to slowly scan and integrate across spectral lines of interest. By integrating lines at low pressures of 15 Torr, improved estimates of $S_o$ can be obtained.

Embodiments can also include a newly developed technique for measuring sensitivity—specifically, to what degree temperature determines the shape of the resulting spectrum. Less error can be incurred from random sources of noise in the spectrum by utilizing a more sensitive system. The sensitivity of present embodiments can be dependent on how the spectral profile (i.e. shape) evolves with temperature by line fitting to the aggregate the spectrum, as discussed above.

Relative sensitivity can be determined based on infinitesimal segments of the aggregate spectrum ($\alpha$).

$$\text{Relative sensitivity} = \frac{|\Delta\alpha|/\alpha}{|\Delta T|/T}\bigg|_v = \left(\frac{T}{\alpha}\right) \cdot \left|\frac{\partial \alpha}{\partial T}\right|_v$$

This can be thought of as the localized sensitivity coefficient at a general point on the spectrum at a specific wavenumber, v. The sensitivity can have a distribution of different values across the pressure-broadened spectrum at different values of v. Therefore, a holistic approach of integrating across the spectrum can yield an averaged result:

$$S_{P,X} = \frac{1}{v_2 - v_1} \int_{v_1}^{v_2} \left(\frac{T}{\alpha}\right) \cdot \left|\frac{\partial \alpha}{\partial T}\right|_v dv \bigg|_{P,X} = \frac{T}{v_2 - v_1} \int_{v_1}^{v_2} \left|\frac{\partial \ln \alpha}{\partial T}\right| dv$$

$S_{P,X}$ is the integrated sensitivity coefficient over an interval that captures a large section of the spectrum. $S_{P,X}$ is also a function of pressure (P) and composition (X). That these are fixed parameters for the purpose of sensitivity calculation can be assumed. The final step can be recognition that the spectral profile, α, also depends on composition (X), pressure (P) and path length (L), apart from temperature. Therefore it can be important to distinguish changes in the spectral profile that are unique to changes in temperature. This can be achieved by observing changes in shape of the aggregate spectrum. Shape change is more sensitively dependent on temperature change—composition, pressure and path length largely alter only the intensity of the spectrum, yielding geometrically similar profiles. Geometrically similar spectra can fail to capture temperature evolution, as the spectral intensity is not uniquely defined by temperature, but also by P, X and L.

Changes in the shape of the spectral profile can be captured by comparing a set of normalized spectra at various temperatures. Normalized spectra can be generated by dividing each one by a reference absorbance, $\alpha^*$, which can nominally correspond to the global maximum absorbance of the aggregate spectrum. Such normalized spectra can be herein termed as $\alpha_N$. Comparing how $\alpha_N$ changes with temperature can yield a definition of the lineshape sensitivity coefficient, $S_{curve}$.

$$S_{curve} = \frac{T}{v_2 - v_1} \int_{v_1}^{v_2} \left| \frac{\partial \ln \alpha_N}{\partial T} \right| dv$$

Figure 6:
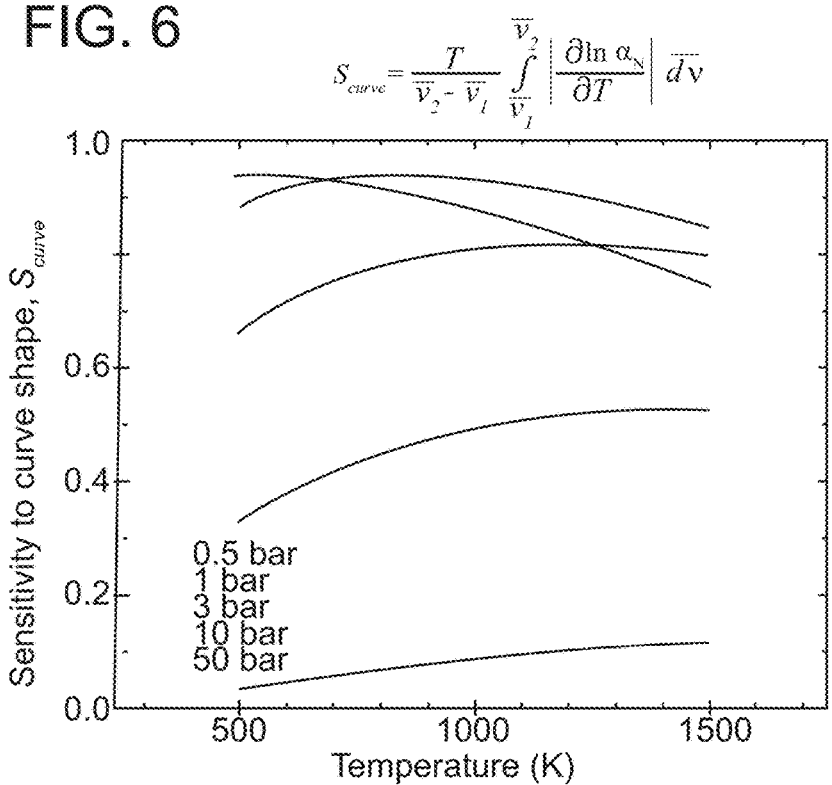
FIG. 6 depicts (a) the sensitivity of how the shape of the curve changes with temperature for various pressures and (b) the sensitivity of temperature inferred from the ratio of two integrated lines.
Figure 6:
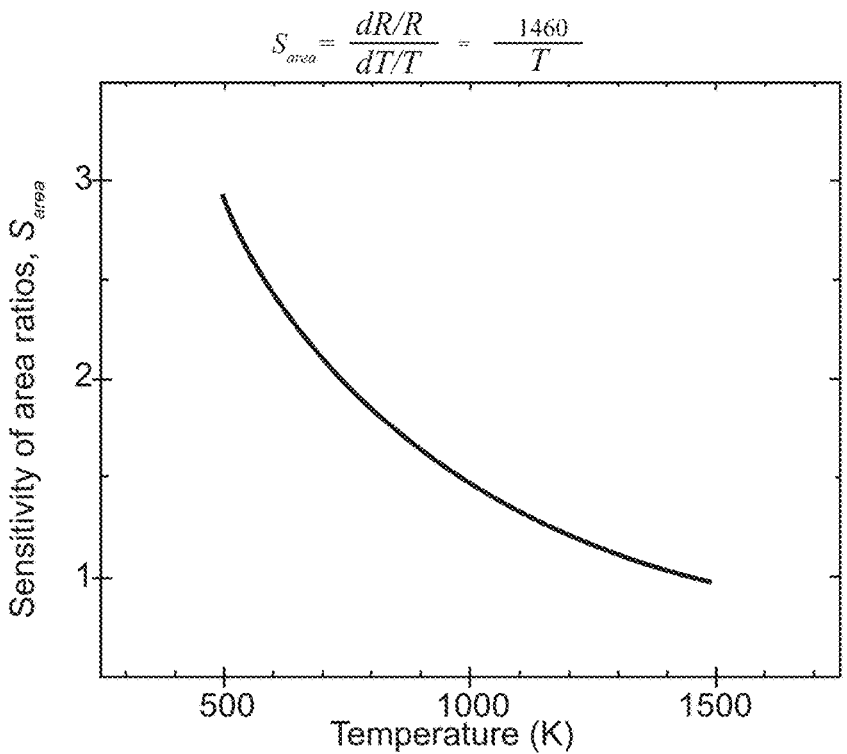

FIG. 6 (a) shows plots and the "shape" of $S_{curve}$ for various pressures up to 50 bar with a composition of 1% water in air. Better lineshape sensitivity can be obtained at around 1 bar over the temperature range of interest (e.g. 500-1500K). These conditions can be relevant to shock tubes in particular.

Another measure of temperature sensitivity is the sensitivity coefficient of the two-line equation that can be used in calculating the temperature from the ratio of the integrated underlying spectra of the aggregate spectrum. A judicious choice of which two lines to use can give a preferred sensitivity, the plot of which is shown in FIG. 6 (b). The plot specifically shows the sensitivity of temperature inferred from the ratio of two integrated lines.

A related aspect of the technique can be the determination of detectability limits of water vapor at various temperatures. Detectability limits can be important, as they can indicate how strong an absorption signal will be at certain conditions, and hence the minimum amount of water needed to achieve a threshold signal-to-noise ratio (unity SNR). This can be accomplished through, for example, simulation by adjusting the water composition at different temperatures whilst maintaining a constant defined SNR of one.

Figure 7:
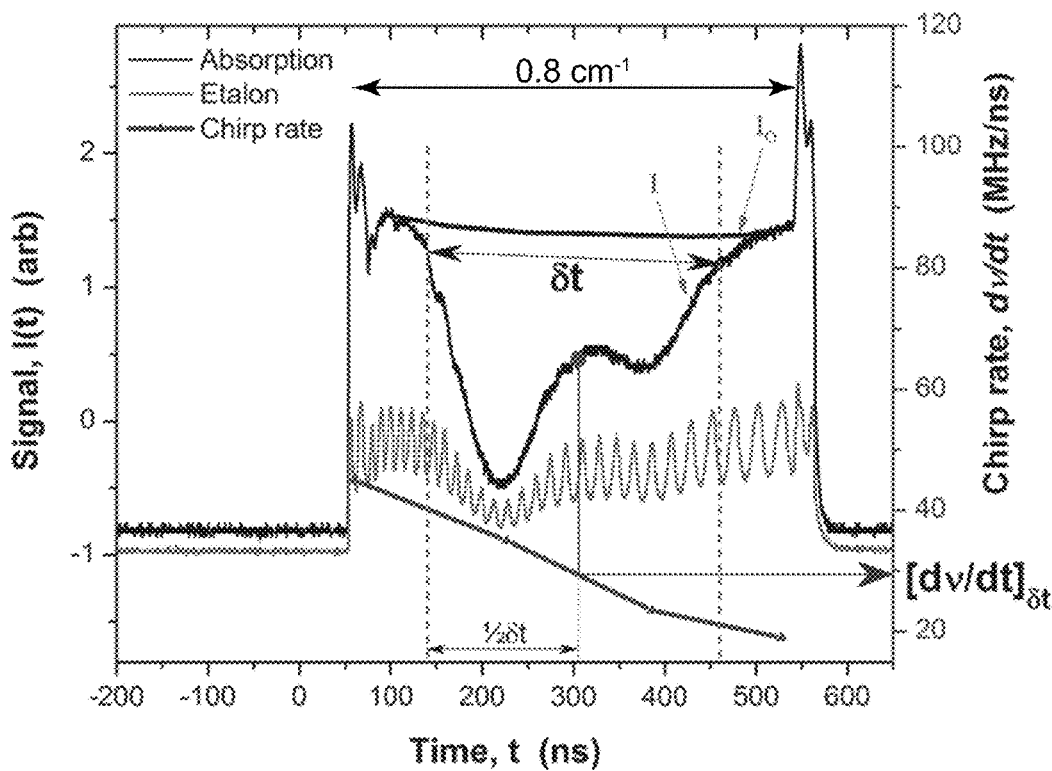
FIG. 7 depicts how temporal resolution within a pulse can be defined and the corresponding chirp rate at the spectral center.

Another aspect of the characterization relates to the resolution of the sensor. Temporal resolution, as an example, can have two dimensions ascribed to it—the repetition rate, as well as the window over which the measurement is made at a so-called point in time. FIG. 7 shows an intrapulse structure with water vapor present at 1 bar. Absorption can be seen from the difference between absorption free state ($I_0$) and with absorption (I).

The window over which a measurement is made can be where most of the absorption occurs, namely δt, which is shown in FIG. 7. This can be defined, for example, by taking the peak absorbance and dividing by $e^2$, a common scientific threshold. The position of the spectral center (i.e. at ½ δt) can vary according to the voltage and/or laser head temperature setting. When the spectral center is shifted toward the left edge of the pulse, for instance, the width of the measurement window, δt, can also decrease. This can equate to an increase in temporal resolution. A shift of the measurement window toward the left can result in locally higher chirp rates, as suggested by the chirp rate plot FIG. 7. The chirp rate can affect the spectral resolution, given by the following relation (4):

$$\Delta v = C \left( \frac{\partial v}{\partial t} \right)^{1/2} \qquad \text{Eqn. (4)}$$

Here, C is a calibration constant, which is dependent on the bandwidth of the detection system. So it follows that when the chirp rate increases, the spectral width of the instrument function can increase, and hence the spectral resolution can decrease. There is therefore a tradeoff between temporal resolution and spectral resolution.

An exemplary application of an embodiment specific to ICES is the homogeneous charged compression ignition (HCCI) concept. HCCI is where fuel and air are well mixed and compressed to the point of auto-ignition. HCCI is desired due to its low emissions and high fuel economy potential. However, HCCI can be subject to technological teething problems such as timing of the auto-ignition event. This ignition can be spontaneous, occurring at no well predefined time or location in the cylinder. Accordingly, ignition can be difficult to predict and control. Consequences of non-ideal ignition affect overall efficiency of the engine and its emissions, as well as more practical concerns such as slow response from more demanding driving conditions. Another advantage of HCCI is its relative immunity to "knock." However, under more demanding driving conditions when a larger fuel-to-air mixture ratio is needed, "knocking" can occur.

Embodiments can be applied to HCCI engines, for example, as part of the onboard engine management system of a vehicle, to improve response times and accuracy, to diagnose operation problems, and to characterize engine operations. From a characterization perspective, embodiments can be utilized to develop insight into engine dynamics, since combustion is governed by fluid dynamical and chemical processes. These are both interdependent on the instantaneous temperature of the combustion gases, and hence the need for precise and non-invasive and highly time-resolved thermometry.

Another application of thermometric embodiments, towards the improvement of the engine-related combustion process, can include shock-tube studies of fuel chemistry. Such studies can form an invaluable part of the arsenal to quantify and refine the combustion process. In such studies, the rate of a single chemical reaction can be determined and characterized by a rate constant, k(T), which is often a sensitive function of temperature. This can be determined firstly by recording changes in molecular composition with time in the experiments during the course of the reaction being investigated, and then repeating that over a set of various initial conditions to extract k(T). Molecular composition is often needed to be experimentally determined during the course of one shock tube experiment, which has traditionally been done under the assumption that the temperature of the gases inside the shock tube are fixed. This is not always true or appropriate because temperatures can significantly vary for different fuels and initial conditions of study. Such assumptions can lead to incorrect measurements of molecular composition, whose error would propagate into the determination of k(T).

Rapid thermometry can be very useful for measuring instantaneous temperature of combusting gases in the context of shock tube studies. This can partly be because present embodiments can robustly meet demanding requirements of high temporal resolution of shock tubes. Typical test times (preceding detonation) can be of the order of milliseconds. Within that time interval, significant changes can occur within microseconds. A benefit of present embodiments is improved accuracy and hence improved precision in the description of the combustion process under a wider set of conditions relevant to combustion. Although generally described so far in the context of determining instantaneous temperature during a test time preceding detonation for improved measurement of molecular composition, present embodiments can equally be of utility for investigating the extreme conditions posed by the detonation process. Under such circumstances, there can be a very rapid rise in temperature of the combusting gases of the order of nanoseconds (ns) to microseconds (μs). Thus, embodiments would also be of interest to experimental researchers in the fields of explosions and detonation processes, as wells in plasma physics and chemistry.

Another useful application can include monitoring of selective non-catalytic reduction (SNCR) processes used in $NO_x$ emissions abatement in power plants. SNCR can involve injecting either ammonia or urea into the firebox of a boiler at a location where the flue gas can be between 1033 and 1366K to react with the nitrogen oxides ($NO_x$) formed in the combustion process. The resulting product of the redox reaction includes nitrogen, carbon dioxide, and water. SNCR requires the temperature of the gases to be within a narrow range (1033<T<1366 K); if T<1033K, $NO_x$ will not be removed from the flue gases, and if T>1366K ammonia will decompose to form more NO, which can be undesirable.

As mentioned above, thermometric embodiments can offer excellent time resolution. This does not limit embodiments only to systems with rapidly varying temperatures. Indeed, embodiments can measure instantaneous temperatures that remain constant or that vary slowly in time. For example, embodiments herein can be suitable for SNCR systems where fluctuations are relatively slow. An advantage lies in the fact that thermometry based on intrapulse spectroscopy can enable one to observe the spectral content within the pulse at a given instant, allowing the identification of interfering lines from rogue species within complex gaseous mixtures such as SNCR where there is $NH_3$, $NO_x$, and $NH_2CONH_2$ (urea) simultaneously present. Clear identification over a spectral range of at least 1 $cm^{-1}$, for example, can facilitate compensation for interference from neighboring lines from other species, or even the mere identification from an unknown species. Nevertheless, an advantage of the present intrapulse approach is that inference of temperature can be independent of the compositional makeup and pressure, because temperature can be calculated from measurement of two lines at substantially a single instant in time. This can render present techniques to be calibration free from the viewpoint of thermodynamic parameters. Further, present embodiments can be relatively simple to implement with relatively few components, for example, a single small quantum cascade laser with no moving parts.

Bearing in mind the above exemplary applications, it is clear that the temperature sensor embodiments herein have strong potential in both the automotive and power generation industries, as well as in applied research. The small-modular size, non-intrusiveness, accuracy, and high time resolution capability can make embodiments particularly useful from both a process control and diagnostic tool perspective.

Intrapulse spectroscopy has not previously been used to measure temperature. Because of the fast scan-rate within the pulse, multiple lines can be scanned across with respect to wavelength. Two different lines can be scanned and integrated to infer the temperature in the gaseous mixture that is being probed. This temperature is a substantially instantaneous one relating to the state of the probed gas at the instant the pulse is generated. The rate of pulses generated can determine temporal resolution (known as the repetition rate), in other words how quickly the sensor can follow changes in the gas being probed. Measurements can be at least as fast as 3 MHz. Another dimension to temporal resolution is the pulse duration. At 2 MHz temporal resolution equates to about 250 ns at a 50% duty cycle. Actual measurements taken within a pulse duration can be short to maintain high fidelity. Pulse duration can be made so short compared to a transient system of interest that this concern can be rendered inconsequential. Present embodiments can therefore be very useful in the case of demanding applications such as shock tubes and engines. By virtue of scanning within the pulse, present methods can also mitigate uncertainty, and hence error, from changes in composition and pressure. This can improve the accuracy of the measurements.

The use of QCLs to probe in the mid-IR can allow for stronger linestrengths (for example, up to 100 times stronger than the near-IR) for certain matter. Further, the output optical power of the laser during the pulse can be measured to be a maximum of 50 mW, which is relatively high compared to most near-IR lasers that have been used in the past to measure temperature. These can be motivations for using QCLs where molecules such as water are probed. However, embodiments can include electromagnetic sources that provide other ranges of radiation, such as far-IR, near-IR, visible, and ultraviolet. A person of ordinary skill in the art would know and understand when such sources are preferred for particular matter under investigation.

Figure 8:
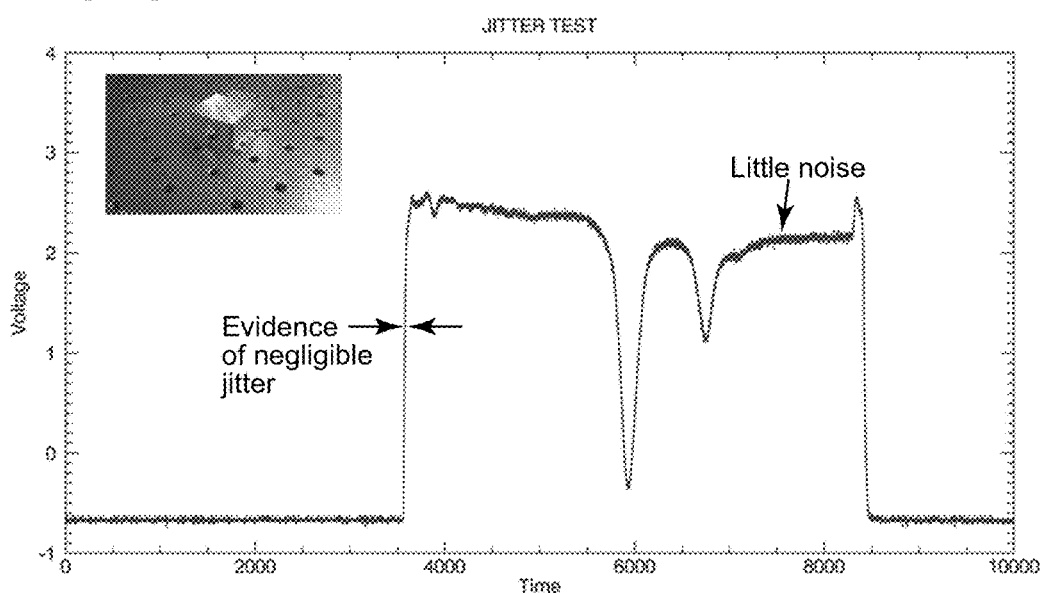
FIG. 8 is a graph depicting a series of 50 overlapping traces of a pulse with absorption present.

FIG. 8 shows experimentally generated signals with absorption present. Fifty traces of instantaneous pulses are shown overlapped on top of each other. The vertical scale is the voltage read on the photodetector. The horizontal scale is the time coordinate. The inset shows an accompanying image of a QCL laser head for generating the signals that is small in size, approximately 30×30×10 mm. Electronic controllers are not shown, but the small unit shown is quite small in contrast to traditional laser systems, for example dye lasers and Nd:YAG lasers.

It should be noted that all the spectra are very well overlapped, with no evidence of jitter in the time domain. If jitter were noticeable, then the different traces would thicken the line or jump from the other traces altogether and would be clearly noticeable. This demonstrates the stability of the QCL and can facilitate data post processing, potentially reducing error that can occur from jitter. There is also a remarkable lack of voltage noise in the signal during the pulse, despite the use of high bandwidth detectors. Noise can appear as high frequency small fluctuations in the voltage domain. However, fluctuation in this example is indeed small, as can be seen in the raw signal in FIG. 8. For the entire duration of the pulse, the trace shown in FIG. 8 is piecewise continuous, which points to the fact that no mode-hops are present during the time the QCL is lasing.

This is consistent with the QCL being a distributed feedback laser (DFB), which do not mode-hop unlike extended cavity lasers. This property can be particularly helpful in that all of the spectrum can be used throughout the entire time domain.

Another contribution that should be noted is that the profile of the pulse during lasing can be relatively smooth and facilitate the ability to utilize the entire pulse range. This can be helped by proper impedance matching of the QCL driver electronics to the QCL laser head, reducing the ringing that would otherwise be evident close to the rising edge of the pulse. There can be some ringing for approximately the first 10 ns, but very little remains throughout the remainder of the pulse. Despite apparently large voltages from the photodetector (<3 volts), this can be within the dynamic range of high bandwidth detectors.

Figure 9:
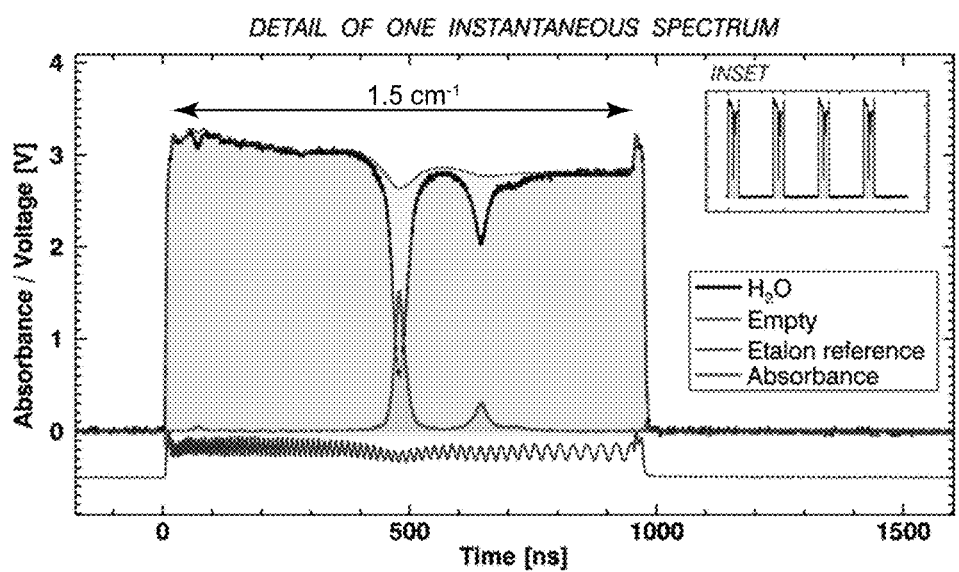
FIG. 9 depicts voltage intensity detected within a pulse, along with the accompanying etalon scan.

FIG. 9 shows, at one instant in time, four signals obtained by an exemplary embodiment. Turning first to the upper two signals, the top smooth signal is from a photodetector when a shock tube is in the empty state (i.e. no water vapor present in the sample). Below that is a trace from a "full" state measurement, showing a signal with strong absorption manifested by the two large dips. Turning to the lower two signals, the accompanying etalon scan, a substantially periodic signal, is shown by the lowest trace. An absorbance signal, calculated from the two upper raw traces can be seen directly above the etalon trace.

It should be noted that there are two small dips in the empty state trace. This is attributable to parasitic absorption from water vapor in the atmosphere surrounding the shock tube and can be assumed during the measurements to be fixed in time. Further, this does not pose a problem in operation, hence no error is incurred.

To obtain the measured absorbance, $\alpha_v$, the natural logarithm of the ratio of the two upper traces of FIG. 9 can be computed, for example, according to Eqn. (1). The calculated trace clearly shows strong absorption, corresponding to absorbance units of 1.5 for a path length of 14 cm and an exemplary test temperature of 1402K and pressure 1.23 bar with a water mole fraction of about 1.6%. The generation of this absorbance spectrum over such a short time duration, as indicated by the time axis, can be made possible by the semiconductor chip inside the QCL rapidly heating as soon as the current pulse is activated. The sudden switching-on of the current can heat the chip causing a concurrent monotonic change in chip length (thermal expansion) and refractive index (optical property). This process can be transient and can occur relatively rapidly over the course of hundreds of nanoseconds. A result can be that the optical frequency emitted from the QCL is down-chirped, meaning that there is a monotonic and rapid decrease in optical frequency during the chirped output. Typical changes in frequency during this process can be as much as 5 cm$^{-1}$, depending on the length that the pulse is active. Downchirps within 2 cm$^{-1}$ can typically be achieved. The downchirp is evident from the etalon scan. This is a trace from another high bandwidth photodetector where a beam is passed through a germanium etalon to create the interference fringes. Such fringes can be used to convert the time axis into an equivalent optical frequency axis (i.e. nanosecond time domain to GHz optical frequency domain).

Figure 10:
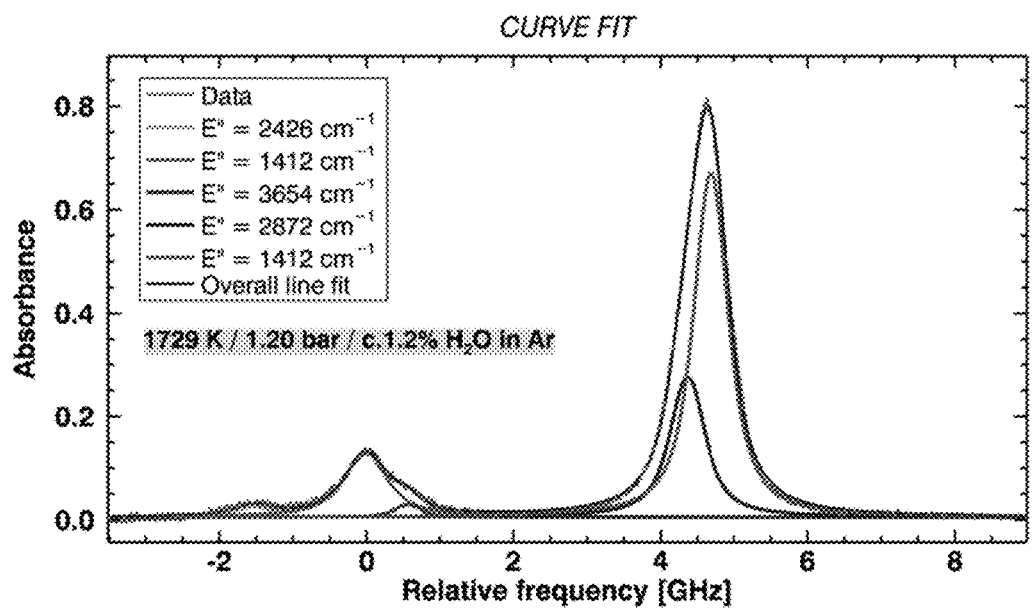
FIG. 10 depicts an absorbance spectrum with accompanying fitted spectrum and 5 underlying Voigt profiles.

FIG. 9 only depicts one single snapshot in time wherein a single absorbance spectrum is generated. The exemplary rate is 250 kHz, as shown by the train of pulses in the inset. However, the pulse can easily be continuously reproduced at a very high repetition frequency, for example, of up to at least 2 to 3 MHz FIG. 10 shows another exemplary experimental absorbance spectrum, but now with an accompanying simulated fit. The spectrum represents an instantaneous spectrum in one single pulse for the case of a shock-heated H$_2$O vapor and argon mixture. The fit line can be composed from the summation of the underlying simulated Voigt profiles at the line positions quoted from the HITRAN database. Each line can have an associated lower energy level, E", again quoted from the HITRAN database. The nominal conditions for this exemplary spectral fit are T=1729K and P=1.2 bar. This can be inferred from shock jump relations and pressure transducers respectively during an experiment.

There is an excellent signal-to-noise ratio (SNR), as shown by the smooth nature of the instantaneous spectrum, demonstrated by a peak SNR of ~200 at the global peak in FIG. 10. Interestingly, the total spectrum spans about 10 GHz (0.33 cm$^{-1}$) using argon as the bath gas at approximately atmospheric pressure. This span is well within the downchirp range within a pulse duration of 1 µs, and in the case of 500 ns. This shows that essentially an entire spectrum can be captured in one rapid pulse, and so being able to capture all the H$_2$O lines in order to be able to integrate the areas underneath them for the purpose of computing calibration-free temperatures and compositions as discussed above. The temperature derived from the integration of the fitted lines is 1716K, which is within 1% of the value calculated from shock jump equations (i.e. 1729K). The molar composition derived from the calculated temperature and the integration of one of the lines resulted in a value of 1.2% H$_2$O.

There can be an element of uncertainty in any measurement and subsequently inferred parameters. Some exemplary estimates of sources of uncertainty are considered herein. For example, there can be two sources of uncertainty for a temperature measurement, T, measurement of the area of the underlying profiles from the line fit (i.e. $\Delta A$), and the measured reference linestrengths from a separate experiment (i.e. $\Delta S_0$). Relative uncertainties in these two parameters can be estimated to be approximately $\Delta A/A=1\%$ and $\Delta S_0/S_0=3\%$. This can be propagated to a relative uncertainty in temperature of approximately $\Delta T/T=4.5\%$. For the composition measurement, X, there can be three extra sources of uncertainty to consider. Pressure, P, and path length, L, can both be measured to within an accuracy of at least 0.4%, and a 4.5% uncertainty in T, which translates to 9% in linestrength, S. These can propagate into a 9.1% uncertainty in composition X. It should be noted that these are typical values of uncertainty in and around 1500K.

Figure 11:
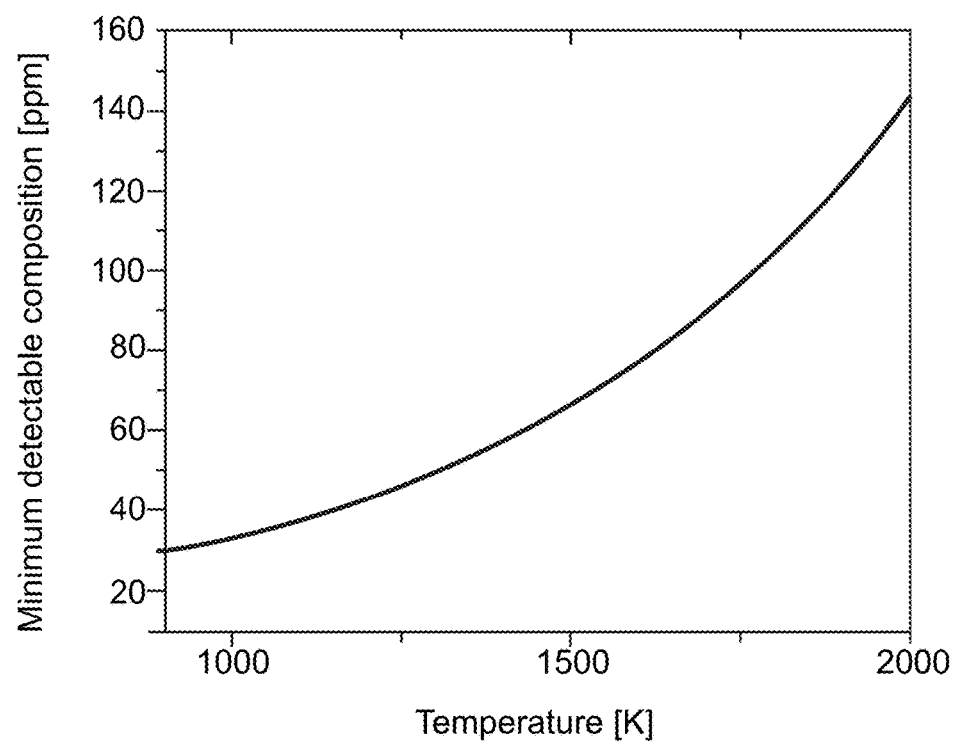
FIG. 11 is a plot of how the minimum detectable water composition in argon varies with sample temperature at P=1.23 bar for the case of unity SNR.

FIG. 11 shows a plot of how minimum detectable composition of water vapor in argon gas can vary with sample temperature at a pressure of 1.23 bar. The detection threshold used in this example is based on unity SNR. The plot demonstrates that reasonable levels of sensitivity by using a direct absorption approach without either enhancing the path length (e.g. using a multi-pass cell) or through noise suppression (e.g. WMS/FMS) with approximately 100 ppm of water vapor. The line used to compute the composition is line 4 of FIG. 10 (i.e. the stronger line within the RHS peak shown). The profile of FIG. 11 monotonically increases and is related to the inverse of the temperature variation of linestrength.

The embodiments may take the form of a hardware embodiment, a software embodiment, or an embodiment combining software and hardware. In one embodiment, the present invention takes the form of a computer-program product that includes computer-useable instructions embodied on one or more computer-readable media.

The various integrated techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

Embodiments may include a general-purpose computer and can have an internal or external memory for storing data and programs such as an operating system (e.g., DOS, Windows 2000™, Windows XP™, Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, in another embodiment, application programs can be externally stored in or performed by one or more device(s) external to the general-purpose computer.

The general-purpose computer may include a central processing unit (CPU) for executing instructions in response to commands, and a communication device for sending and receiving data. One example of the communication device is a modem. Other examples include a transceiver, a communication card, an antenna, a network adapter, or some other mechanism capable of transmitting and receiving data over a communications link through a wired or wireless data pathway.

The general-purpose computer may also include an input/output interface that enables wired or wireless connection to various peripheral devices. Examples of peripheral devices include, but are not limited to, a mouse, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing a network and communicating with other computer systems. Examples of a network that can be utilized to implement various embodiments include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In one implementation, a processor-based system of the general-purpose computer can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

In one embodiment, a network can include a communications interface that allows software and data to be transferred between client devices, central servers, and other components. Examples of communications interfaces can include a modem, a network interface (such as, for example, an Ethernet card), a communications port, and a PCMCIA slot and card. Software and data transferred via a communications interface may be in the form of signals, which can be electronic, electromagnetic, optical or other signals capable of being received by a communications interface. These signals may be provided to a communications interface via a channel capable of carrying signals and can be implemented using a wireless medium, wire or cable, fiber optics or other communications medium. Some examples of a channel can include a phone line, a cellular phone link, an RF link, a network interface, and other suitable communications channels.

In this document, the terms "computer program medium" and "computer readable medium" are generally used to refer to media such as a removable storage device, a disk capable of installation in a disk drive, and signals on a channel. These computer program products may provide software or program instructions to a computer system.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media include computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

In an embodiment where the elements are implemented using software, the software can be stored in, or transmitted via, a computer program product and loaded into a computer system using, for example, a removable storage drive, hard drive or communications interface. The control logic (software), when executed by the processor, may cause the processor to perform the functions of the techniques described herein.

In another embodiment, the elements may be implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements may be implanted using a combination of both hardware and software.

In another embodiment, the computer-based methods can be accessed or implemented over the World Wide Web by providing access via a Web Page to the methods described herein. Accordingly, the Web Page may be identified by a Universal Resource Locator (URL). The URL may denote both a server and a particular file or page on the server.

Each of the following references is hereby incorporated by reference in its entirety.

Sanders, et al., "Diode-laser Sensor for Monitoring Multiple Combustion Parameters in Pulse Detonation Engines," 2000, Proceedings of the Combustion Institute, Vol. 20, pp. 587-594.

Normand, et al., "Fast, Real-time Spectrometer Based on Quantum-cascade Laser," 2003, Opt. Lett., Vol. 28, No. 1, pp. 16-18.

"Homogeneous Charge Compression Ignition (HCCI) Technology—A Report to the U.S. Congress," 2001, U.S. Dept. of Energy, Energy Efficiency and Renewable Energy, Office of Transportation Technologies.

Rothman, et al., "The HITRAN 2008 Molecular Spectroscopic Database," 2009, J. of Quantitative Spectroscopy & Radiative Transfer 110, pp. 533-572.

Nwaboh, "Measurement of CO Amount Fractions Using a Pulsed Quantum-cascade Laser Operated in the Intrapulse Mode," 2011, Appl. Phys. B, 103, pp. 947-957.

Farooq, et al., "Measurements of $CO_2$ Concentration and Temperature at High Pressures Using 1f-normalized Wavelength Modulation Spectroscopy with Second Harmonic Detection Near 2.7 µm," 2009, Appl. Opt., Vol. 48, No. 35, pp. 6740-753.

Li, et al., "Near-infrared Diode Laser Absorption Sensor for Rapid Measurements of Temperature and Water Vapor in a Shock Tube," 2007, Appl. Phys. B, Vol. 89, pp. 407-416.

Grouiez, et al., "Pulsed Quantum-cascade-laser Spectroscopy with Intermediate-size Pulses: Application to NH3 in the 10 µm Region," 2010, Appl. Phys. B, Vol. 100, pp. 265-273.

Rieker, et al., "Rapid Measurements of Temperature and $H_2O$ Concentration in IC Engines with a Spark Plug-mounted Diode Laser Sensor," 2007, Proceedings of the Combustion Institute, Vol. 31, pp. 3041-049.

Van Helden, et al., "Rapid Passage Effects in Nitrous Oxide Induced by a Chirped External Cavity Quantum Cascade Laser," 2009, Appl. Phys. Lett., 94, 051116.

Northern, et al., "Rapid Passage Signals Induced by Chirped Quantum Cascade Laser Radiation: K State Dependent-Delay Effects in the v2 Band of $NH_3$," 2010, Opt. Lett., Vol. 35, No. 16, pp. 2750-52.

Manne, et al., "Sensitive Detection of Ammonia and Ethylene with a Pulsed Quantum Cascade Laser Using Intra and Interpulse Spectroscopic Techniques," 2008, Appl. Phys. B, Vol. 94, pp. 337-344

Ebert, et al., "Simultaneous Diode-laser-based In Situ Detection of Multiple Species and Temperature in a Gas-fired Power Plant," 2000, Proceedings of the Combustion Institute, Vol. 28, pp. 423-430.

Kranendonk, et al., "Wavelength-agile Sensor Applied for HCCI Engine Measurements," 2005, Proceedings of the Combustion Institute, Vol. 30, 1619-627.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope or the invention. In addition, from the foregoing it will be seen that this invention is one well adapted to attain all the ends and objects set forth above, together with other advantages. It will be understood that certain features and sub-combinations are of utility and may be employed without reference to other features and sub-combinations. This is contemplated and within the scope of the appended claims. All such similar substitutes and modifications apparent to those skilled in the art are deemed to be within the spirit and scope of the invention as defined by the appended claims.

What is claimed is:

1. A sensor system, comprising:
   a laser configured to produce chirped pulses at a constant wavelength;
   a function generator coupled to the laser to provide a pulse train to the laser to produce the chirped pulses at the constant wavelength;
   at least one detector configured to receive a measurement beam from the laser,
   wherein the sensor system is configured to record an intrapulse absorption spectrum using the measurement beam, and
   wherein the intrapulse absorption spectrum includes at least two spectral lines within one of the chirped pulses; and a computer configured to determine an instantaneous temperature based on the intrapulse absorption spectrum within one of the chirped pulses by
calculating first and second areas corresponding to the two spectral lines,
computing a ratio of the first and second areas, and
determining the instantaneous temperature based on the ratio.

2. The sensor system of claim 1, wherein the laser is a quantum cascade laser and wherein each of the at least one detector comprises a photodiode.

3. The sensor system of claim 1, wherein the laser is a distributed feedback quantum cascade laser and wherein each of the at least one detector comprises a photodiode.

4. The sensor system of claim 1, wherein the at least one detector comprises a second detector configured to receive a reference beam from the laser.

5. The sensor system of claim 1, wherein each of the chirped pulses are less than 10 microseconds in duration.

6. The sensor system of claim 1, wherein each of the chirped pulses are less than 1 microsecond in duration.

7. The sensor system of claim 6, wherein the laser is a distributed laser comprising a temperature controller and a voltage controller, and wherein the at least one detector comprises a high bandwidth photodiode, wherein the sensor system is configured to determine a temperature based on the intrapulse absorption spectrum.

8. The sensor system of claim 1, wherein each of the chirped pulses are less than 500 nanoseconds in duration.

9. The sensor system of claim 1, wherein each of the chirped pulses are less than 100 nanoseconds in duration.

10. A method of measuring an instantaneous temperature of a material, comprising:
tuning a beam of coherent electromagnetic radiation to a range of peak absorbance in the material by supplying a pulse train from a function generator to a source of the beam;
transmitting the tuned beam through the material at a constant wavelength;
chirping the tuned beam at a rate of less than 5 microseconds;
measuring, by a computer, an intrapulse absorbance of the tuned beam, wherein the intrapulse absorbance includes at least two spectral lines and the intrapulse absorbance is measured while the tuned beam is transmitted at the constant wavelength; and
determining, using the computer, the instantaneous temperature based on the intrapulse absorbance within one of the pulses by calculating first and second areas corresponding to the two spectral lines,
computing a ratio of the first and second areas, and
determining the instantaneous temperature is based on the ratio.

11. A method of rapid thermometry using intrapulse spectroscopy, comprising:
supplying a pulse train from a function generator to an electromagnetic radiation source;
propagating, by the electromagnetic source, pulses of electromagnetic radiation to a region at a constant wavelength, wherein each of the pulses is chirped;
detecting, by a detector, the pulses from the region;
determining from the pulses an intrapulse absorbance spectrum, wherein the intrapulse absorbance spectrum includes at least two spectral lines; and
determining, by the computer an instantaneous temperature of the region based on the intrapulse absorbance spectrum within one of the pulses by calculating first and second areas corresponding to the two spectral lines,
computing a ratio of the first and second areas, and
determining the instantaneous temperature based on the ratio.

12. The method of claim 11, wherein detecting the pulses from the region comprises detecting reference pulses and detecting measurement pulses.

13. The method of claim 11, wherein the instantaneous temperature is determined based on an integration of the two spectral lines.

14. The method of claim 13, wherein each of the pulses have a pulse duration of less than 1 microsecond.

15. The method of claim 14, wherein each of the pulses have a pulse duration of less than 500 nanoseconds.

16. The method of claim 13, wherein the intrapulse absorbance spectrum is based on an aggregation of spectra.

17. The method of claim 13, wherein the two spectral lines have a ratio, R, based on the integrated areas of each of the two spectral lines, and wherein the temperature, T, is determined based on the equation $$T = \frac{\frac{hc}{k}(E_2'' - E_1'')}{\ln R + \ln \frac{S_2(T_0)}{S_1(T_0)} + \frac{hc}{k}\frac{(E_2'' - E_1'')}{T_0}},$$

wherein h, c, k and E'' are constants, $S(T_0)$ is a linestrength at a reference temperature of $T_0$.

18. A rapid thermometry system configured to record an intrapulse absorption spectrum, comprising:
a laser configured to produce chirped pulses at a constant wavelength;
a function generator coupled to the laser to provide a pulse train to the laser to produce the chirped pulses at the constant wavelength;
a detector configured to receive a measurement beam from the laser;
a computer having a non-transitory computer readable medium containing executable code, wherein the computer and the executable code are configured to:
detect the chirped pulses;
determine from the chirped pulses the intrapulse absorption spectrum, wherein the intrapulse absorption spectrum includes at least two spectral lines; and
determine an instantaneous temperature of the region based on the intrapulse absorption spectrum within one of the chirped pulses by calculating first and second areas corresponding to the two spectral lines,
computing a ratio of the first and second areas, and
determining the temperature based on the ratio.

19. The system of claim 18, wherein the computer and the executable code are further configured to integrate the two spectral lines to determine the instantaneous temperature.

20. The sensor system of claim 1, wherein the laser is a single laser.

* * * * *